April 2, 1963 S. D. POOL ET AL 3,083,812
WAGON ELEVATOR FOR CORN PICKERS
Filed Dec. 23, 1959 3 Sheets-Sheet 1

INVENTORS
Stuart D. Pool
Benjamin M. Hyman
Paul O. Pippel
Atty.

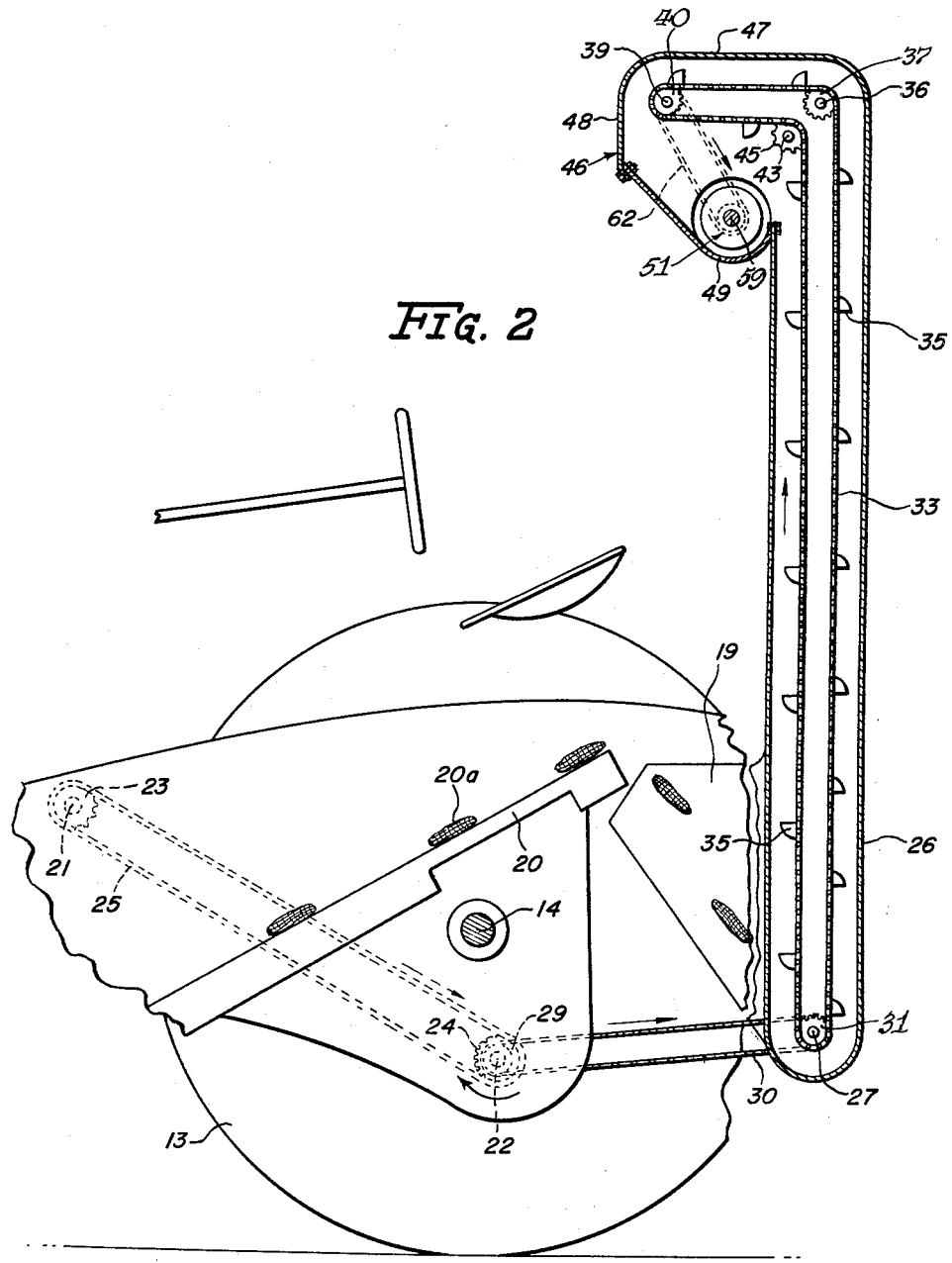

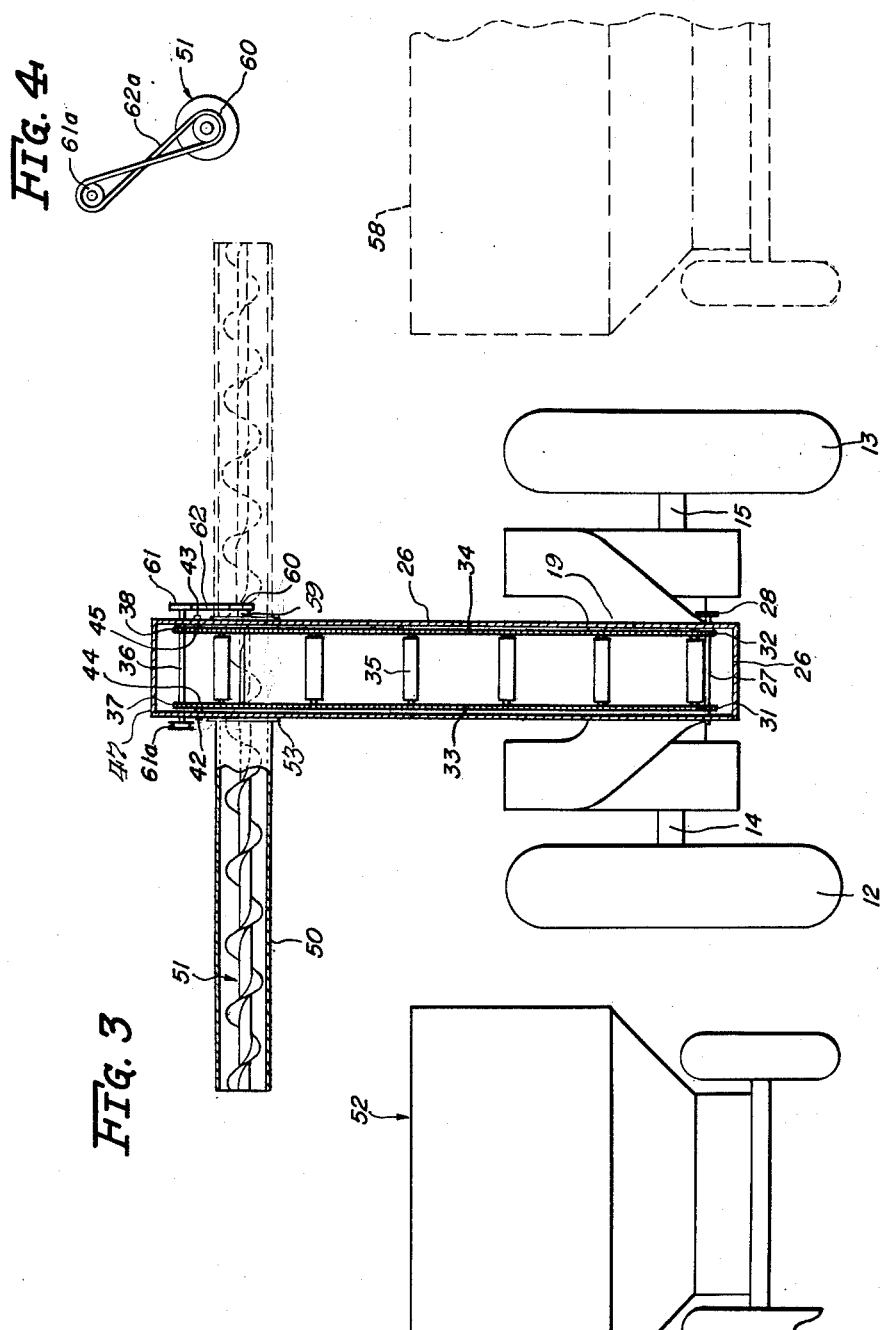

United States Patent Office 3,083,812
Patented Apr. 2, 1963

3,083,812
WAGON ELEVATOR FOR CORN PICKERS
Stuart D. Pool, Naperville, and Benjamin M. Hyman, East Moline, Ill., assignors to International Harvester Company, Chicago, Ill., a corporation of New Jersey
Filed Dec. 23, 1959, Ser. No. 861,684
3 Claims. (Cl. 198—104)

This invention relates to a new and improved wagon elevator for corn pickers.

Mechanical corn pickers have been in use for many years and during all of that time there has been the problem of conveying harvested ears of corn to some depository such as a trailing wagon or a truck which is to receive the corn and carry it back to a bin or other receptacle in which the corn is to be eventually stored. The conventional type of wagon elevator or conveying means between the picker and the receptacle into which the corn is to be temporarily deposited has taken the form of an upwardly and rearwardly inclined elevator. On occasions this elevator has been capable of lateral swinging to effect a somewhat greater latitude of discharge position. However, the elevator has been disposed either rearwardly or sidewardly but as a rule it would not be capable of readjustment from one position to the other. Further when a corn picker was equipped with an elevator projecting upwardly and laterally to one side of the line of travel of the implement, then it would be impossible to discharge from the other side of the picker and hence it is with these limitations in mind that the present invention was conceived.

It is therefore a principal object of the present invention to provide a wagon or discharge elevator for harvested corn which is capable of discharging laterally to either side of the picker with relatively simple changes so that a truck or wagon disposed laterally of the corn picker may receive the discharging corn regardless of which side it is on.

Another important object of this invention is to equip a wagon elevator conveyor for corn pickers or other harvesting machines with a vertically rising portion and having a laterally extending conveyor shiftable from one side to the other side for discharge of harvested grain to either one side or the other side of the corn picker at the desire of the operator.

Still another important object of this invention is to supply a corn picker with a corn discharge mechanism for optionally effecting the conveying of harvested corn to either one side or the other side of the picker to thus enable the corn picker to be versatile in its operation and effectively work regardless of the direction in which it is driven.

Still another and further important object of this invention is to provide a receiving hopper for harvested corn in a corn harvesting machine and a vertical elevator in the hopper to thereupon elevate the gathered corn vertically for redistribution laterally to either side of the corn picker.

Another important object of this invention is the provision of means in a shiftable elevator mechanism to effect discharge of harvested grain or corn or the like to either one side or the other side of a tractor mounted corn harvester and this shifting necessitating only a crossing of a V-belt in the driving of the laterally projecting auger conveyor and a repositioning of that auger conveyor to either one side or the other.

Other and further important objects and advantages will become apparent from the disclosures in the following specification and accompanying drawings.

In the drawings:

FIGURE 2 is a partial side elevational view partly broken away to show the interior construction and the source of power for the wagon elevator of this invention;

FIGURE 3 is a rear elevational view of the wagon elevator and corn picker as shown in FIGURES 1 and 2; and FIGURE 4 is a detail view of the belt drive to the laterally feeding auger conveyor.

Figure 1:
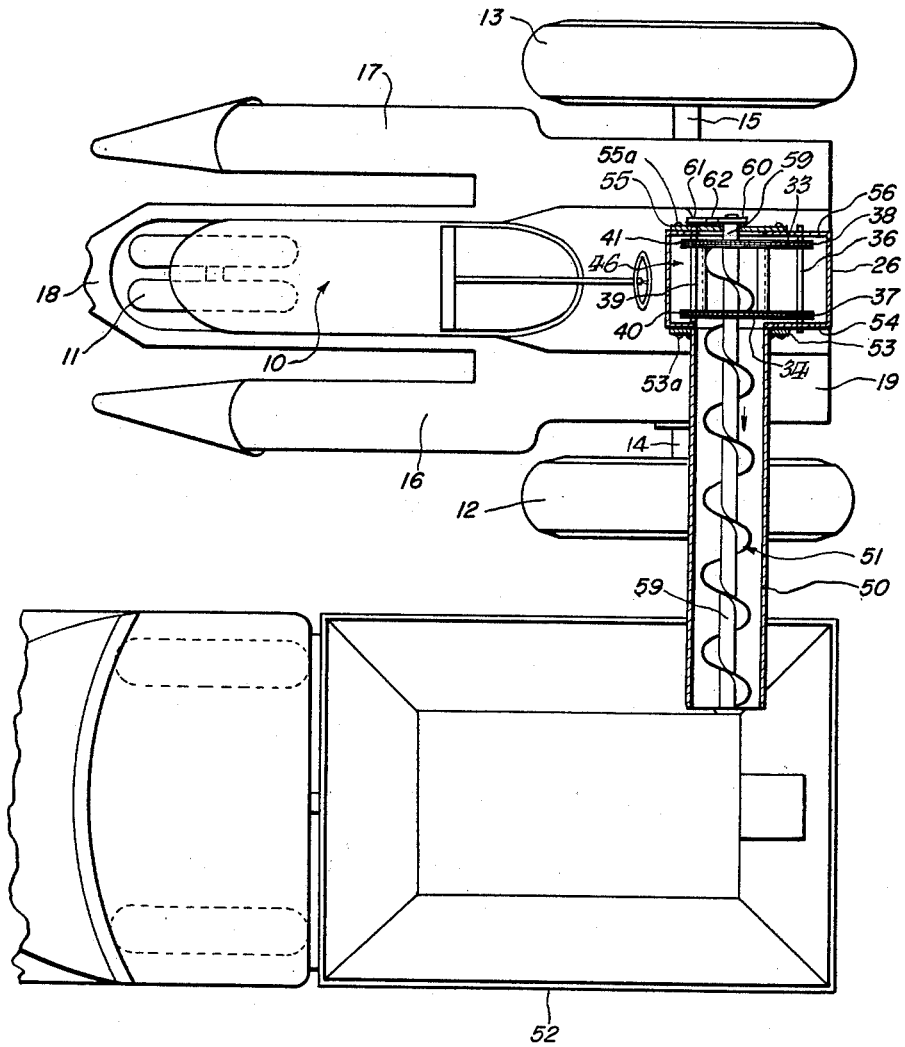
FIGURE 1 is a top plan view of a corn harvester and a corn receiving truck spaced in side by side relationship and the corn picker having a mechanism for conveying harvested corn from the picker to the adjacent wagon.

As shown in the drawings, the reference numeral 10 indicates generally a tractor of the farm or agricultural type which has front steerable wheels 11 and large rear spaced apart drive wheels 12 and 13. The rear wheels 12 and 13 are mounted on aligned axles 14 and 15. A corn harvesting unit 16 is mounted on one side of the tractor between the large wheel 12 and the central body portion of the tractor 10. Similarly a corn harvester unit 17 is mounted on the other side of the tractor between the tractor body and the spaced apart traction wheel 13. A center divider or grain dividing member 18 is provided on the front of the tractor 10 substantially over and around the front steerable wheels 11. The center divider guides standing or down corn into either one of the harvesting units 16 or 17 on the sides of the tractor 10 whereafter the corn is taken from the stalks by suitable mechanism within these harvesting units. The rear of the corn picking units 16 and 17 is provided with a combined corn receiving hopper 19 substantially between the units and capable of receiving harvested corn from both of said units. As best shown in FIGURE 2, a husking bed 20 is inclined upwardly and rearwardly in both of the picking units 16 and 17 to carry ears of corn as shown at 20a in FIGURE 2 for deposit in the hopper 19.

A side power take-off shaft 21 is provided on the tractor 10 and a spaced apart jackshaft 22 is disposed parallel to the power take-off shaft 21 and is journally carried on the tractor beneath the aligned axles 14 and 15. A driving sprocket 23 is provided on the power take-off shaft 21 and similarly a sprocket 24 in the same planar alignment with the sprocket 23 is mounted on the jackshaft 22. A chain 25 imparts drive from the power take-off shaft to the jackshaft 22.

The elevating mechanism of this invention is equipped with a substantially vertically disposed housing 26 extending upwardly from the hopper 19. A shaft 27 is journalled in a relatively transverse position within the housing 26 at a position substantially at the lower end thereof. A sprocket 28 is mounted on the outer end of the shaft 27. A sprocket 29 is affixed to the driven jackshaft 22 at a position spaced from the sprocket 24 also on the jackshaft. The sprocket 29 is in planar alignment with the sprocket 28 so that a chain 30 extending between the sprockets 28 and 29 may uninterruptedly effect a drive from the jackshaft 22 to the shaft 27.

Referring to FIGURE 3, spaced apart sprockets 31 and 32 are provided on the shaft 27 within the vertical housing 26. The elevator within the vertical housing 26 comprises spaced apart endless chains 33 and 34 which are mounted on and are driven by the sprockets 31 and 32. The chains 33 and 34 extend upwardly within the vertical housing and it will subsequently be described where and how the other portions of the chains are mounted. The elevator is provided with bucket type flights 35 disposed between the spaced chains 33 and 34 at substantially regular intervals around the endless chains 33 and 34.

A transverse shaft 36 is journally mounted in the vertical housing 26 at substantially the top thereof. Spaced apart sprockets 37 and 38 are affixed to the shaft 36 in planar alignment with the sprockets 31 and 32. A shaft 39 (FIG. 2) is journalled in a forward portion of the top of the housing 26 and disposed parallel to the shaft 36; shaft 39 carries spaced apart sprockets 40 and 41. Stub shafts 42 and 43 (FIG. 3) project inwardly from and are journalled within the upper portion of the vertical housing 26 at a position slightly forwardly of and beneath the transverse shaft 36. Sprockets 44 and 45 are mounted on the stub shafts 42 and 43 respectively. These shafts and their unitary sprockets comprise the complete elevator mechanism for the device of this invention. The chains 33 and 34 pass upwardly over the sprockets 37 and 38 on the shaft 36, thence forwardly around the sprockets 40 and 41 on the shaft 39, thence rearwardly around the sprockets 44 and 45 on the stub shafts 42 and 43, whereupon the chain continues downwardly for return to the sprockets 31 and 32.

The intermediate buckets 35 between the chains 33 and 34 are adapted to carry corn 20a deposited in the hopper 19 upwardly through the vertical housing 26 for deposit into a depending chamber 46 in the top and forward portion of the vertical housing 26. The chamber 46 is defined by a top 47, a front 48 and a bottom 49. The chamber 46 thus forms a second hopper or the like for receiving the harvested corn 20a. From this position it is possible with the device of the present invention to feed corn ears to either side of the corn picker, depending upon how the auxiliary discharge mechanism is arranged. In the device as shown in FIGURES 1 and 3 in the full lines thereof a tube 50 projects laterally from the chamber 46. An auger 51 in the tube 50 is arranged and constructed to receive corn 20a and move it from the chamber 46 outwardly through the tube 50 to a position over a truck or wagon 52. The tube 50 is provided with an annular flange 53 at its inner end whereby it is bolted at 53a to the side 54 of the chamber 46. A cover plate 55 is bolted at 55a to the other side 56 of the chamber 46 to thus enclose the chamber against loss of corn through the other side thereof. Accordingly all of the corn deposited in the chamber 46 by the chain elevator mechanism described within the vertical housing 26 is carried through the tube 50 to a position over the waiting truck or wagon 52 adjacent the side of the corn harvester.

When the tube 50 is in the position of the dashed lines as shown in FIGURE 3 on the other side of the picker it has necessarily been turned around so that the flange 53 is bolted to the side 56 of the chamber 46 of the vertical housing 26. In this position harvested corn may be delivered to the other side of the picker to a wagon or truck 58 on that side of the picker, as shown in dashed lines in FIGURE 3. The cover plate 55 is preliminarily removed from one side to make room for the attachment of the auger conveyor tube 50. This cover is then used to bolt on the other side of the chamber 46 to which the flange 53 was previously attached thereupon covering the opening in that side and insuring that all of the corn within the chamber 46 is discharged through the tube 50 to the other side of the picker for deposit into a wagon 58 positioned adjacent to that other side of the picker.

The auger 51 is provided with a central shaft 59 and onto this shaft is placed a V-pulley 60 at the end of the auger 51. A V-pulley 61 is positioned on the outer end of the shaft 39 outside of the housing 26. A V-belt 62 is arranged to join the pulleys 60 and 61 to thereupon drive the auger in a direction to carry corn outwardly for discharge over the wagon 52. Now when the auger and its enclosing tube 51 is turned around and placed on the other side and properly assembled, it is desired to run the auger in the opposite direction to thereupon carry corn outwardly for deposit in the wagon 58. In this readjusted position of the wagon elevator discharge mechanism as shown in dashed lines in FIGURE 3, a V-pulley 61a is mounted on the other end of the shaft 39. A V-belt 62a is crossed and joins the V-pulleys 60 and 61a. This crossing of the V-belt 62a is shown in detail in FIGURE 4 and is for the purpose of obtaining the proper direction of rotation of the auger 51 to feed corn outwardly to the other side of the picker through the auger and its enclosing tube 50. The V-belt 62a is used in lieu of V-belt 62 to permit the belt to be crossed and thus to accomplish the proper direction of rotation of the auger 51.

It will be seen that herein is provided a wagon elevator for corn pickers which is distinctive in that it carries the harvested corn vertically upwardly for deposit into a hopper at that upper level and that the hopper at this upper level may be discharged laterally outwardly in either direction by means of a shiftable auger and tube arrangement as just described. Numerous details of construction may be varied throughout a wide range without departing from the principles disclosed herein and we therefore do not propose limiting the patent granted hereon otherwise than as indicated by the appended claims.

What is claimed is:

1. For use with a corn harvester movable in the direction of its longitudinal axis and operable to discharge corn ears at a reference location, an elevating and conveying system for the corn ears comprising a housing disposed generally vertically with respect to the ground plane, a first hopper, communicating with said housing at the lower end thereof, positioned adjacent said reference location to receive the corn ears, a second hopper, communicating with said housing at the upper end thereof, defining a first discharge aperture at one side thereof and a second discharge aperture at the other side thereof, a first conveyor, positioned within said housing, for lifting the corn ears in the transfer thereof from said first hopper to said second hopper, a second conveyor for moving ears of corn from one end of said second conveyor to the other end of said second conveyor, means for selectively affixing said second conveyor to one side of said second hopper in communication with one of said discharge apertures, said second conveyor extending outwardly from said second hopper substantially perpendicular to said longitudinal axis, means for effectively closing the other of said discharge apertures to complete a material feeding channel including said first hopper, said first conveyor, said second hopper, said one discharge aperture, and said second conveyor, means for driving said first conveyor to raise the corn ears from said first hopper to said second hopper, and means for intercoupling said first and second conveyors to drive the second conveyor as said first conveyor is driven to move the ears away from said longitudinal axis for descent by gravity into a suitable depository.

2. A combination as set forth in claim 1 in which said second conveyor includes an auger mechanism and a tubular enclosure therefor.

3. A combination as set forth in claim 2 in which said means for affixing the second conveyor to the second hopper includes a flanged end on said tubular enclosure for removably fastening to either side of said second hopper, and said means for driving the conveyors is operative in either position of the auger and the tubular enclosure regardless of the side of the second hopper to which said second conveyor is affixed.

References Cited in the file of this patent

UNITED STATES PATENTS

| | | |
|---|---|---|
| 464,501 | Hartley | Dec. 8, 1891 |
| 1,170,445 | Hartley | Feb. 1, 1916 |
| 1,222,286 | Hamilton | Apr. 10, 1917 |
| 1,746,649 | Hancock | Feb. 11, 1930 |
| 1,786,020 | McWilliams | Dec. 23, 1930 |
| 2,347,437 | Saxe | Apr. 25, 1944 |
| 2,667,028 | Weishaar | Jan. 26, 1954 |

FOREIGN PATENTS

| | | |
|---|---|---|
| 814,112 | France | Mar. 8, 1937 |